(12) United States Patent
Klausner et al.

(10) Patent No.: US 9,337,516 B2
(45) Date of Patent: May 10, 2016

(54) SYSTEM FOR PREVENTING CONDENSATE FORMATION ON A BATTERY

(71) Applicant: Robert Bosch GmbH, Stuttgart (DE)

(72) Inventors: Markus Klausner, Leonberg-Hoefingen (DE); Anselm Berg, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 129 days.

(21) Appl. No.: 14/158,945

(22) Filed: Jan. 20, 2014

(65) Prior Publication Data

US 2014/0205873 A1    Jul. 24, 2014

(30) Foreign Application Priority Data

Jan. 18, 2013 (DE) .................. 10 2013 200 782

(51) Int. Cl.
    *H01M 10/42*    (2006.01)
    *H01M 2/10*     (2006.01)
    *H01M 10/625*   (2014.01)
    *H01M 10/613*   (2014.01)
    *B60L 11/18*    (2006.01)

(52) U.S. Cl.
    CPC ........... *H01M 10/42* (2013.01); *B60L 11/1877* (2013.01); *B60L 11/1879* (2013.01); *H01M 2/1077* (2013.01); *H01M 10/613* (2015.04); *H01M 10/625* (2015.04); *H01M 2220/20* (2013.01)

(58) Field of Classification Search
    CPC . H01M 10/42; H01M 10/625; H01M 10/613; H01M 2/1077; H01M 2220/20; B60L 11/18; B60L 11/1877; B60L 11/1879
    See application file for complete search history.

(56) References Cited

U.S. PATENT DOCUMENTS

| 2001/0046624 A1* | 11/2001 | Goto et al. ................. 429/99 |
| 2002/0187390 A1* | 12/2002 | Kimoto et al. .............. 429/99 |
| 2004/0261377 A1* | 12/2004 | Sung ...................... 55/385.3 |
| 2009/0139781 A1* | 6/2009 | Straubel .................. 180/65.1 |
| 2011/0046828 A1* | 2/2011 | Chander et al. ............ 701/22 |
| 2011/0256432 A1* | 10/2011 | TenHouten et al. ......... 429/50 |
| 2013/0049688 A1* | 2/2013 | Minami .................. 320/109 |
| 2013/0111939 A1* | 5/2013 | Yan ...................... 62/282 |

FOREIGN PATENT DOCUMENTS

| DE | 102009058880 | 6/2011 | | |
| JP | 2008222041 | 9/2008 | | |
| KR | 1020080053717 | 6/2008 | | |
| WO | WO 2011/072937 | * 7/2011 | ............ H01M 10/42 |
| WO | WO 2011/145380 | * 11/2011 | ............ B60K 11/06 |

OTHER PUBLICATIONS

Happian-Smith ed. "An introduction to Modern Vehicle Design" (C) 2001 Butterworth-Heinenemann Oxford UK p. 121.*

* cited by examiner

*Primary Examiner* — Patrick Ryan
*Assistant Examiner* — Aaron Greso
(74) *Attorney, Agent, or Firm* — Michael Best & Friedrich LLP

(57) ABSTRACT

A system for preventing condensate formation on a battery (1), in particular on a battery (1) that is cooled by means of a cooling device, wherein the battery (1) is surrounded by a housing (6), and wherein the housing (6) has at least one air inlet opening (8) and at least one air outlet opening (9), wherein the at least one air inlet opening (8) is designed such that air supplied to the housing (6) can flow into the housing (6) so as to flow around the battery (1), and wherein the at least one air outlet opening (9) is designed such that air can flow out of the housing (6).

12 Claims, 3 Drawing Sheets

SYSTEM FOR PREVENTING CONDENSATE FORMATION ON A BATTERY

BACKGROUND OF THE INVENTION

The invention relates to a system for preventing condensate formation on a battery, in particular on a battery that is cooled by means of a cooling device, wherein the battery is surrounded by a housing. In particular, the invention relates to a system for preventing condensate formation on a battery which is provided for use in a vehicle with a passenger compartment.

In hybrid, plug-in hybrid and/or electric vehicles, batteries or storage batteries are used in order to provide the required electrical energy for the propulsion of the vehicle. Here, as batteries, use is made in particular of lithium-ion batteries constructed from a multiplicity of interconnected battery cells. Since said batteries, like other battery types, can normally be optimally utilized only in a certain temperature range, the batteries used are normally temperature-controlled by means of a thermal management system. Here, various cooling devices, for example cooling plates through which a cooling medium flows, are used for cooling the battery or the battery cells of the battery. In particular in order to protect the battery and the associated battery components against environmental influences and mechanical loads and in order to protect persons against electric shocks, said batteries are normally accommodated in a housing which fully surrounds the battery. In this case, a housing may in particular also be an installation space, which is provided for accommodating the battery, in the vehicle.

During the operation of a vehicle and associated usage of corresponding batteries, there is the problem that, in particular owing to the cooling of the battery or battery cells, the dewpoint temperature, that is to say the temperature at which the formation of condensate begins to occur, can be locally undershot. As a result of the dewpoint temperature being undershot, moisture present in the air surrounding the battery can condense and be deposited on the cooled battery. Since condensation water can in this case also form on electrically conductive components, there is the risk of the condensed water causing damage to the battery, for example owing to electrical contacts being short-circuited by the condensation water.

SUMMARY OF THE INVENTION

Against this background, it is an object of the present invention to provide a system which makes the operation of a battery which is used in vehicles, in particular in hybrid, plug-in hybrid and/or electric vehicles, in particular of a battery which is cooled by means of a cooling device, safer, in particular by preventing condensate formation on a cold battery.

To achieve the object, a system is proposed for preventing condensate formation on a battery, in particular on a battery that is cooled by means of a cooling device, wherein the battery is surrounded by a housing, wherein the housing has at least one air inlet opening and at least one air outlet opening. Here, the at least one air inlet opening is designed such that air supplied to the housing can flow into the housing so as to flow around the battery. Here, the at least one air outlet opening is designed such that air can flow out of the housing. Aside from the at least one air inlet opening and the at least one air outlet opening, the housing is advantageously designed to be air-tight. The at least one air inlet opening and the at least one air outlet opening are advantageously arranged in the housing such that an air flow is generated through the housing, wherein the battery is advantageously arranged within the airflow. For this purpose, it is preferable for the at least one air inlet opening and the at least one air outlet opening to be arranged so as to be situated opposite one another, that is to say in particular on different walls of the housing. According to the invention, as one design variant, it is provided in particular that the housing has exactly one air inlet opening and exactly one air outlet opening. Within the context of the present invention, the housing of the battery is in particular a housing together with which the battery is or has been mounted in the vehicle. In particular, however, it is also provided according to the invention that the housing is an installation space, in which the battery is mounted, in a vehicle, wherein the installation space forms the housing of the battery.

The invention is based on the realization that, by means of a supply of air, in particular of air of low relative humidity and/or low dewpoint temperature, moisture can be absorbed from the housing in which the battery is arranged and can be discharged by virtue of said air flowing out, whereby the formation of condensate can be prevented. In one particularly advantageous refinement of the invention, the housing and the at least one air inlet opening can be or are arranged in a vehicle such that air from the passenger compartment of the vehicle, that is to say from the vehicle interior, can flow into the housing. Furthermore, in the case of the housing being arranged in a vehicle, the housing and the at least one air outlet opening are arranged such that the at least one air outlet opening is arranged on the outside of the vehicle, preferably on the underside of the vehicle, and thus the housing is connected via the air outlet opening to the ambient air. Here, the invention utilizes the further realization that, in particular while the vehicle is travelling, a pressure difference is generated between the interior of the passenger compartment of a vehicle and the air between the vehicle underside and roadway, which pressure difference causes air to flow from the interior of the passenger compartment into the housing via the air inlet opening and to escape through the air outlet opening, wherein the air from the interior of the passenger compartment normally exhibits low relative humidity, in particular owing to the air conditioning of a passenger compartment.

One particularly advantageous refinement of the invention is characterized by an air supply device having at least one air inlet opening and having at least one air outlet opening which is connected to the at least one air inlet opening of the housing, wherein the air supply device is designed to supply air, which flows in via the at least one air inlet opening, to the housing, such that air supplied to the housing flows into the housing via the at least one air inlet opening. The air supply device is advantageously closed in an air-tight or substantially air-tight manner aside from the at least one air inlet opening and the at least one air outlet opening. The air supply device is thus advantageously designed to supply air to the housing over distances. Here, the distance may range from a few centimeters up to several meters. The air supply device is advantageously designed in the form of a hose, in the form of a pipe or in the form of a duct. If the housing has multiple air inlet openings, then it is advantageously provided that the air supply device, at one end thereof, is correspondingly branched and has the same number of air outlet openings as there are air inlet openings, said air outlet openings being connected in each case to the air inlet openings. In one design variant, the air outlet opening of the air supply device may be designed to be of such a size that it covers all of the air inlet openings upon connection to the housing. The connection of the air outlet opening to the air inlet opening or to the housing may be realized for example by virtue of the at least one air outlet opening being plugged into or onto the at least one air inlet opening. Furthermore, screwing or adhesive bonding may be provided as further or alternative connection solutions. The connection between the at least one air outlet opening and the at least one air inlet opening is preferably designed to be air-tight, for which purpose corresponding sealing elements such as rubber seals may be provided.

According to a further advantageous aspect of the invention, the air to be supplied to the housing, preferably the air to be supplied to the housing by means of the air supply device, has moisture extracted from it, preferably by means of condensation drying, before said air is supplied to the housing. The air to be supplied to the housing is in this case advantageously conducted along an evaporator before being supplied to the housing. Here, the air cools on the evaporator, wherein water is separated out of the air on the evaporator such that moisture is extracted from the air. The air is advantageously supplied to the evaporator using the air supply device. For this purpose, the air supply device may have a recess. In one design variant of the air supply device, the air supply device has an evaporator and a device for discharging the separated-out water. In one preferred refinement, it is provided that, if the system is used in vehicles which are equipped with an air-conditioning system, the evaporator of the air-conditioning system is utilized for the condensation drying.

In one particularly preferred refinement of the invention, it is provided that the supply of air to the housing can be controlled by means of a control device. For this purpose, it is advantageous for an actuating device to be provided at the at least one air inlet opening of the air supply device and/or for an actuating device to be provided within the air supply device, by means of which actuating device the air flow rate to be supplied and/or the flow speed of the air to be supplied can be controlled. It is advantageously possible for the size of the air inlet opening to be varied by means of the actuating device arranged at the air inlet opening. By means of the actuating device arranged within the air supply device, it is advantageously possible for the cross section of the air supply device to be varied, in particular such that the cross section at the associated position in the air supply device is made smaller or larger by means of the orientation of the actuating device. If the system according to the invention is used in a vehicle, the control device can preferably also be used to control whether outside air or air from the interior of the passenger compartment is to be supplied to the housing by means of the air supply device. It is advantageously provided here that outside air is supplied to the housing via at least one first air inlet opening of the air supply device, and air from the interior of the passenger compartment is supplied to the housing via at least one second air inlet opening, wherein the air supply device correspondingly branches to the respective air inlet openings. For this purpose, the control device advantageously activates the actuating devices arranged at the respective air inlet openings. In one advantageous design variant, it is provided that an actuating device, preferably an air supply mixing flap, is arranged within the branch of the air supply device, by means of which actuating device the supply of air can be controlled, preferably by means of the control device, such that it is also possible in particular for air composed of a mixture of outside air and passenger compartment interior air to be supplied to the housing.

The control device is advantageously also designed to control the supply of air as a function of the humidity of the air that can be supplied. Here, the air humidity of air that can be supplied is advantageously determined by means of an air humidity determination device. In this way, it is advantageously possible for the housing to be supplied with the air that can absorb more moisture. In one advantageous refinement, the air humidity determination device is a hot film air mass sensor (HFM), preferably a heated wire anemometer, by means of which the amount of moisture in the air is determined. In a further advantageous refinement of the invention, it is provided that, in the housing, there is provided at least one measuring device which receives measurement data from the control device. Here, the control device advantageously controls the supply of air as a function of the received measurement data. As a measuring device, there is proposed in particular a sensor for detecting the moisture within the housing and/or on the battery. In addition or alternatively, there is proposed a measuring device, preferably an impedance sensor or capacitive sensor, for determining the dewpoint temperature within the housing. In a further advantageous refinement, the control device is also designed to activate an evaporator by means of which the air to be supplied to the housing has moisture extracted from it before said air is supplied to the housing. In a further advantageous refinement, the control device is also designed to control the supply of air so as to conduct the air past an evaporator which is in operation, preferably the evaporator of a vehicle air-conditioning system if the system according to the invention is used in a vehicle, such that the air to be supplied to the housing has moisture extracted from it by the evaporator.

A further advantageous design variant is characterized by means for increasing the flow speed of the air to be supplied to the housing. The means for increasing the flow speed can advantageously likewise be activated by the control device. A blower and/or an ejector pump is proposed as a preferred means for increasing the flow speed. In particular in conjunction with the use of a system according to the invention in a vehicle, it is proposed that the ejector pump be arranged such that relative wind can flow into the ejector pump, wherein owing to the high impetus of the air of the relative wind, air is drawn out of the interior of the passenger compartment and the mixed air is supplied to the housing, preferably by means of the air supply device.

A further advantageous refinement of the invention is characterized by means for preventing the ingress of solid matter and/or liquids into the housing via the at least one air outlet opening and/or the at least one air inlet opening of the housing. In particular, to prevent the ingress of solid matter and/or liquids into the housing, the outlet opening advantageously has an air-permeable protective device, preferably a semipermeable diaphragm. The air discharge device is preferably in the form of a protective device. In one advantageous refinement, the air discharge device is for this purpose preferably of labyrinthine form, for example with a loop extending through 360°, such that the ingress of liquid, in particular the ingress of water, is impeded. As a further or alternative protective measure, in particular for preventing the ingress of surging water if the system according to the invention is used in a vehicle, for example when the vehicle travels through puddles, it is proposed that a ball valve be incorporated in the air discharge device, which ball valve closes off the air discharge device in the event of a surging ingress of liquid into the air discharge device, and thus prevents an ingress of liquid into the housing via the at least one air outlet opening of the housing.

A further advantageous refinement of the invention is characterized by means for preventing gases released by the battery from escaping from the housing through the at least one air inlet opening and/or through the at least one air inlet opening of the air supply device. A release of gases may take place in particular in the event of a so-called thermal runaway of the battery or a thermal runaway of one or more battery cells of the battery. This may be caused by high electrical currents, overcharging of the battery during a charging process, or high temperatures. In order that the released gases do not pass into the vehicle interior, the means for preventing the escape of gases released by the battery or by one or more battery cells of the battery prevents the gases from escaping from the housing through the air inlet opening and/or prevents the gases from escaping from the air inlet opening of the air supply device connected to the air inlet opening. The means is advantageously configured as a ball valve which is incorporated into the inlet opening and which automatically closes in the event of rising internal pressure in the housing by virtue of the ball closing the air inlet opening under the action of the pressure. The released gas can then escape via the air outlet opening. In one advantageous design variant, the means is a valve which is open during normal operation and which is closed, preferably through activation by means of a control device, in the event of a release of gas. Here, the valve may be arranged at the air inlet opening and/or within the air supply device and/or at the at least one air inlet opening of the air supply device. It is advantageous for a release of gas to be detected by means of a sensor, preferably a gas sensor, and for a detection signal to be transmitted to the control device.

A particularly preferred refinement of the invention provides that the system is designed for use in a vehicle with a passenger compartment, in particular for use in a hybrid, plug-in hybrid or electric motor vehicle.

The at least one air inlet opening of the air supply device may advantageously be arranged on a vehicle such that outside air can be supplied to the housing via the at least one air inlet opening by means of the air supply device. In one advantageous refinement, the at least one air inlet opening in this case can be or is arranged on the vehicle body preferably such that relative wind as outside air can flow into the air supply device via the at least one air inlet opening and is supplied to the housing of the battery by means of the air supply device, wherein the supplied outside air flows into the housing via the at least one air inlet opening of the housing and, as a result, air flows out of the housing via the at least one air outlet opening. In one preferred refinement, the at least one air inlet opening can be or is arranged in the region of the base of the windscreen. This advantageously utilizes the fact that the air supply for the vehicle interior air-conditioning system is also arranged in this region of the vehicle.

It is advantageously also provided that the at least one air inlet opening of the air supply device can be arranged in a vehicle such that air from the passenger compartment can be supplied to the housing via the at least one air inlet opening by means of the air supply device. This advantageously utilizes the fact that the passenger compartment of a vehicle often has conditioned and thus relatively dry air supplied to it because the conditioned air has already had moisture extracted from it by condensation drying. The air supply device is advantageously of less complex design in the case of such an embodiment because the distance that has to be overcome by means of the air supply device is smaller in the case of such an embodiment. Depending on the housing arrangement, the distance to be overcome may be only a few centimeters, whereby assembly is also advantageously simplified. In a further advantageous refinement of the invention, at least one air inlet opening of the air supply device can be or is arranged in a vehicle such that air from the passenger compartment can be supplied to the housing via the at least one air inlet opening by means of the air supply device, and at least one further air inlet opening of the air supply device can be or is arranged on a vehicle such that outside air can be supplied to the housing via the at least one air inlet opening by means of the air supply device.

It is advantageously provided that the housing can be arranged in a vehicle such that air flowing out of the housing via the at least one air outlet opening emerges outside the passenger compartment of a vehicle. Thus, if a system according to the invention is used in a vehicle, air flowing out of the housing is discharged directly from the vehicle to the environment. It is particularly preferably provided that the housing can be or is arranged with the outlet opening on the underfloor of the vehicle such that air from the housing flows out of the vehicle, and is thus discharged to the ambient air, at the vehicle underside. In one particularly preferred refinement, an air discharge device having at least one air inlet opening and at least one air outlet opening is provided, wherein the air discharge device is connected via the at least one air inlet opening to the at least one air outlet opening of the housing. Here, the air discharge device is designed such that air flowing out of the housing via the at least one air outlet opening flows into the air discharge device via the at least one air inlet opening of the air discharge device, and said air is discharged from the housing by the air discharge device. The air discharged from the housing in this case flows out of the at least one air outlet opening of the air discharge device. The at least one air outlet opening of the air discharge device can be or is advantageously arranged on the vehicle underfloor, such that the air escapes from the housing at the vehicle underfloor.

BRIEF DESCRIPTION OF THE DRAWINGS

Further advantageous details, features and design details of the invention will be explained in more detail in conjunction with the exemplary embodiments illustrated in the figures, in which.

DETAILED DESCRIPTION

Figure 1:
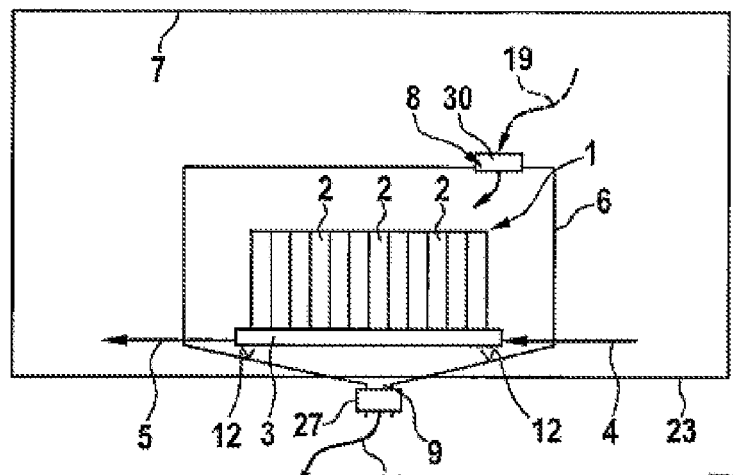
FIG. 1 shows an exemplary embodiment of a system according to the invention in a schematic illustration.

FIG. 1 to FIG. 5 each illustrate a battery 1 in a housing 6. Here, the battery 1 has in each case multiple interconnected battery cells 2 and may for example be a lithium-ion battery. In the exemplary embodiments, the battery 1 is cooled in each case by a cooling device. In this case, the cooling device has a heat-conducting cooling plate through which coolant flows and on which the battery 1 is arranged. Here, the cooling plate 3 has a coolant inlet 4, via which a coolant is supplied, and a coolant outlet 5, via which the coolant is discharged. Here, the system according to the invention is however not restricted either to the battery type illustrated in the exemplary embodiments or to the cooling device illustrated in the exemplary embodiments.

FIG. 1 shows, in a schematic illustration, an exemplary embodiment for a system according to the invention for preventing condensate formation on a battery 1. The battery 1, surrounded by a housing 6, is arranged in a passenger compartment 7 of an electric vehicle. The passenger compartment 7 is in this case schematically illustrated by the rectangle denoted by 7. The housing 6 has in this case an air inlet opening 8 which is designed such that air can flow into the housing 6 via the air inlet opening 8 so as to flow around the battery 1. In order that, in the event of a release of gas by the battery 1, in particular as a result of so-called thermal runaway of one or more battery cells 2, the gases are prevented from passing via the air inlet opening 8 into the passenger compartment 7, it is advantageous for there to be arranged at the air inlet opening 8 a ball valve as a means 30 for preventing the escape of gases released by the battery. If the internal pressure in the housing 6 rises owing to a release of gas, the ball of the ball valve is moved counter to the force of gravity by the pressure, and thus closes the air inlet opening 8.

Furthermore, the housing 6 has an air outlet opening 9 which is designed such that air can flow out of the housing 6. Aside from the air inlet opening 8 and the air outlet opening 9, the housing 6 is closed off in a substantially air-tight manner, that is to say closed off such that, under normal operating conditions, air cannot flow in and/or out through other openings. The housing base surface 12 of the housing 6 is preferably of funnel-shaped form, whereby a flow of the air out through the air outlet opening 9 is improved. Furthermore, by means of the inclined base surface 12, liquid, for example condensation water, can flow out of the housing 6. As can be seen from FIG. 1, the air inlet opening 8 and the air outlet opening 9 are arranged opposite one another. Here, the air inlet opening 8 is arranged such that air 19 can flow into the housing 6 from the passenger compartment 7. In the exemplary embodiment illustrated in FIG. 1, the electric vehicle is equipped with an air-conditioning system (not explicitly illustrated in FIG. 1), wherein air, before being supplied into the passenger compartment 7, has been conducted along an evaporator, whereby the air 19 has had moisture extracted from it by means of condensation drying. The housing 6 and the air outlet opening 9 are arranged such that the housing 6 is connected to the outside air via the air outlet opening 9. In this case, the air outlet opening 9 projects out of the vehicle floor 23. For protection against ingress of liquids and/or solid matter, the air outlet opening 9 has a protective device 27. An ingress of solid matter such as stones or leaves is prevented by means of a screen structure (not explicitly illustrated in FIG. 1). In particular, for protection against surging water, the protective device 27 also has a ball valve (not explicitly illustrated in FIG. 1) which closes off the air outlet opening 9 if a surge of water presses against the ball valve.

While the vehicle is travelling, a pressure difference is generated between the pressure in the passenger compartment 7 and the pressure outside the passenger compartment 7, whereby air 19 flows from the passenger compartment 7 into the housing 6 via the air inlet opening 8 (as illustrated symbolically by the arrow 10). Here, the inflowing air 10 flows around the battery 1, absorbs moisture from the housing 6 in the process, and flows out of the housing 6 via the air outlet opening 9. Here, the air flowing out of the housing 6 is illustrated symbolically by the arrow 11. By means of this targeted supply of air 19 from the passenger compartment with a lower dewpoint temperature than the air in the housing 6, condensed water is discharged from the housing 6, or condensation of water in the housing, in particular on the battery, is prevented.

Figure 2:
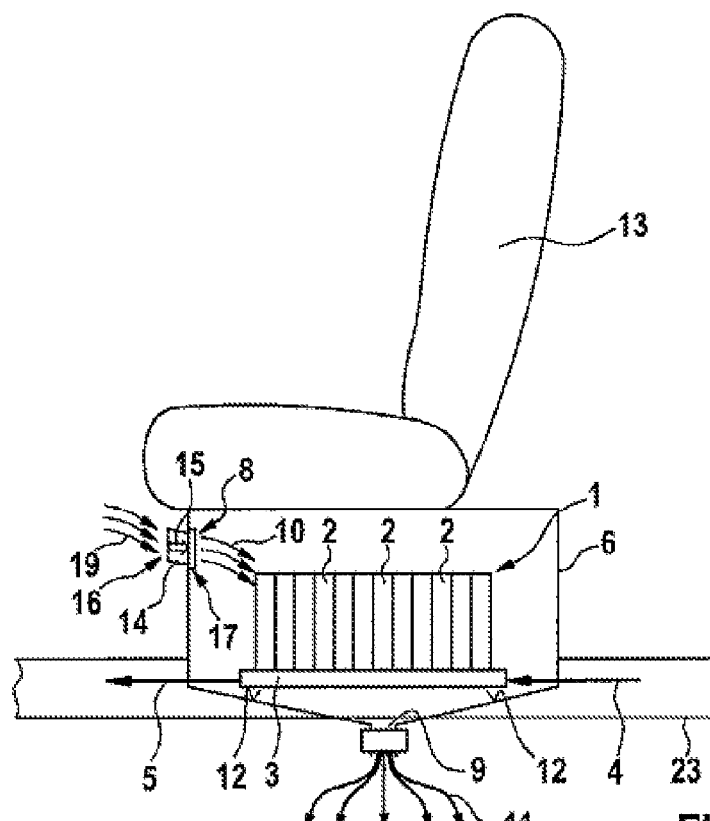
FIG. 2 shows a further exemplary embodiment of a system according to the invention in a schematic illustration.

FIG. 2 illustrates a further exemplary embodiment of a system according to the invention. The housing 6 with the battery 1 is arranged in a passenger compartment 7, beneath the rear seat bench 13, of an electric vehicle. An air inlet opening 8 is arranged laterally on the housing 6. An air supply device 14 is plugged into the air inlet opening 8. Here, the air supply device 14 has an air inlet opening 16 and an air outlet opening 17. The air supply device 14 is connected by way of the air outlet opening 17 to the air inlet opening 8. Furthermore, the housing 6 has an air outlet opening 9 which is arranged outside the passenger compartment 7 on the vehicle floor 23 so as to be oriented toward the roadway. Air 19 flows into the air supply device 14 from the passenger compartment 7 via the air inlet opening 16 of the air supply device 14, wherein the air 19 is supplied to the housing 6 via the air supply device 14, and the supplied air 15 flows into the housing 6 via the air inlet opening 8 of the housing 6. The inflowing air 10 at least partially flows around the battery 1, absorbs moisture from the housing 6, and flows out of the housing 6 by the air outlet opening 9 (as symbolically illustrated by the arrows 11).

Figure 3:
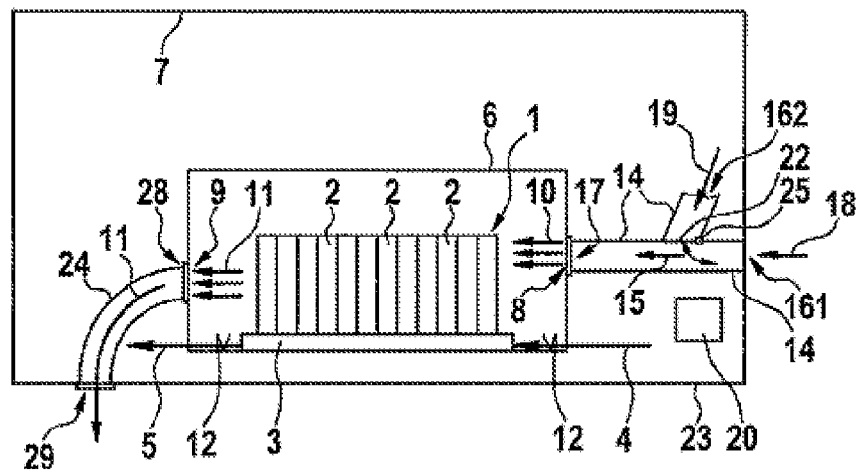
FIG. 3 shows a further exemplary embodiment of a system according to the invention in a schematic illustration.

FIG. 3 illustrates a further exemplary embodiment for a system according to the invention. A battery 1 which is surrounded by a housing 6 is arranged in a vehicle. The housing 6 has an air inlet opening 8 and an air outlet opening 9 which are arranged so as to be situated opposite one another. Air 15 is supplied to the housing 6 by means of an air supply device 14. For this purpose, the air supply device 14 has an air outlet opening 17 which is screwed to the housing 6 and hereby connected to the air inlet opening 8. Furthermore, the air supply device 14 has a first air inlet opening 161 and a second air inlet opening 162. In this case, the first air inlet opening 161 is arranged on the vehicle body such that relative wind 18, that is to say air outside the vehicle, can flow into the air supply device 14 through the air inlet opening 161 and be supplied to the housing 6 by means of the air supply device 14. By contrast, the second air inlet opening 162 is arranged such that air 19 from the passenger compartment 7 can flow into the air supply device 14 and be supplied to the housing 6 by means of the air supply device 14. The air supply device 14 furthermore has, as an actuating device, an air supply mixing flap 22 which is arranged on a hinge 25. The air supply mixing flap 22 can be adjusted by means of a control device 20 in the direction of the double arrow illustrated in FIG. 3. In this way, it is possible to realize settings in which only outside air 18 (in the actuation position illustrated in FIG. 3) or only interior air 19, or a mixture of outside air 18 and interior air 19, is supplied to the housing 6. Here, the supply of the air is controlled in particular as a function of the dewpoint temperature of the outside air 18 and the dewpoint temperature of the interior air 19. The air with the lower dewpoint temperature is supplied to the housing 6.

The air 15 supplied to the housing then flows into the housing 6 via the air inlet opening 8. Here, the inflowing air 10 absorbs moisture from the housing 6. In order that the air 10 can flow out of the housing 6 again, the housing 6 has an air outlet opening 9 which is connected to an air discharge device 24. For this purpose, the air discharge device 24 has an air inlet opening 28 which is plugged onto, and connected by adhesive bonding to, the air outlet opening 9. The air discharge device 24 also has an air outlet opening 29 which leads out of the vehicle floor 23 such that the outflowing air 11 is discharged directly to the ambient air via the air outlet opening 29 of the air discharge device 24.

Figure 4:
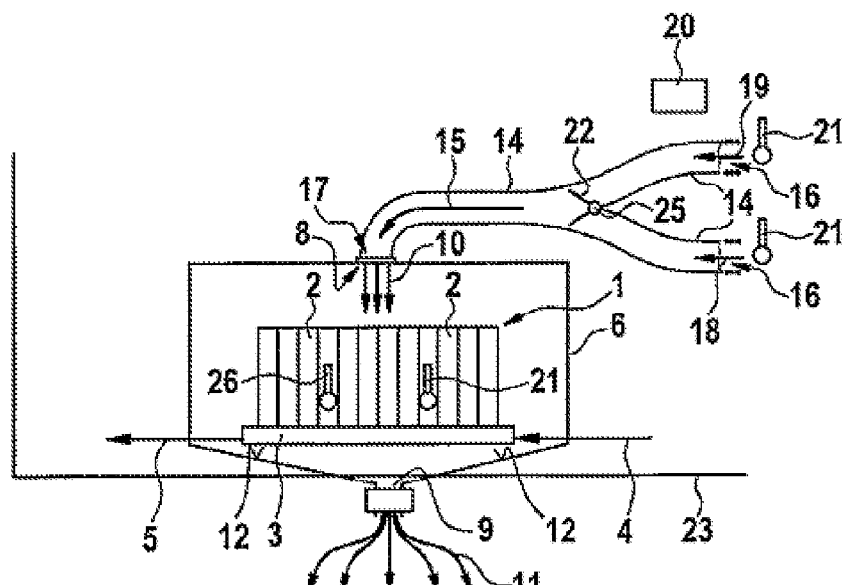
FIG. 4 shows a further exemplary embodiment of a system according to the invention in a schematic illustration.

FIG. 4 shows a further exemplary embodiment for a system according to the invention. As already explained in conjunction with the exemplary embodiment illustrated in FIG. 3, the supply of air takes place via a branched air supply device 14. Here, by means of an air supply mixing flap 22, the control device 20 can control whether air 19 from the vehicle interior or outside air 18 is to be supplied to the housing 6. In the case of the system illustrated in FIG. 4, the air humidity of the air 18 and that of the air 19 is determined in each case by means of a hot film air mass sensor 21. Here, the measurement values are transmitted to the control device 20. The control device 20 evaluates the received measurement values and controls the air supply flap such that the air with the greater moisture absorption capability, or the lower dewpoint temperature, is supplied to the housing 6. In a design variant which is not illustrated, depending on the measured air humidity in the air, the air to be supplied can, by means of the control device 20, be conducted in particular along an evaporator which, by means of condensation drying, extracts moisture from the air to be supplied.

Furthermore, the control device 20 is connected to further measurement devices arranged on the battery 1, specifically a further hot film air mass sensor 21 and a capacitive sensor 26 for determining the dewpoint temperature, wherein the control device 20 controls the supply of air 15 to the housing 6 as a function of the measurement values received by the control device 20 from the hot film air mass sensor 21 and from the capacitive sensor 26. Here, the supply of air 15 can be controlled by means of the air supply mixing flap 22 and/or by means of a blower (not illustrated in FIG. 3) which can draw in air 18 or air 19 and supply said air 18 or 19 to the housing 6 via the air supply device 14. The air 15 supplied to the housing 6 flows into the housing 6 via the air inlet opening 8, absorbs moisture from the housing 6 and flows out of the housing 6 through the outlet opening 9.

A further design variant not explicitly illustrated in FIG. 4 provides that a chemosensor is also arranged in the housing 6, which chemosensor is connected to the control device 20. Here, the chemosensor is designed to detect a release of gas and, in the event of detection of a release of gas, transmit a detection signal to the control device 20. When the control device 20 receives a detection signal, it controls the air supply mixing flap 22 such that the latter completely closes the air supply device 14 and no released gases can escape via the air inlet openings 16 of the air supply device 14. In this design variant, the air supply mixing flap 22 constitutes a means for preventing the escape of gases released by the battery 1.

Figure 5:
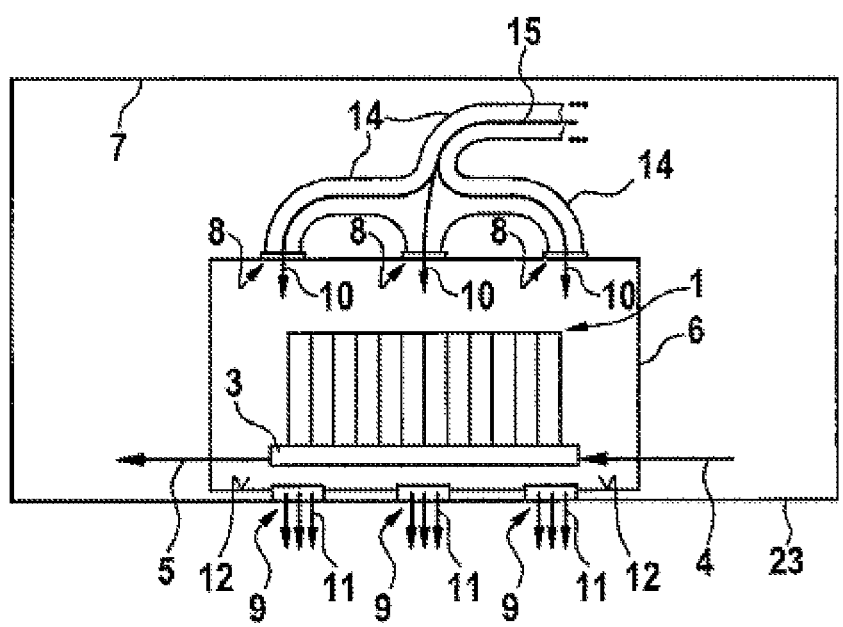
FIG. 5 shows a further exemplary embodiment of a system according to the invention in a schematic illustration.

FIG. 5 illustrates a further exemplary embodiment for a system according to the invention. Here, the exemplary embodiment shows a housing 6 which has multiple air inlet openings 8 and multiple air outlet openings 9. Here, the air inlet openings 8 are connected to an air supply device 14 via which air from the interior of the vehicle or air from outside the vehicle can be supplied.

The exemplary embodiments illustrated in and explained in conjunction with the figures serve for the explanation of the invention, and do not constitute a restriction thereof.

What is claimed is:

1. A system for preventing condensate formation on a battery (1), wherein the battery (1) is surrounded by a housing (6), characterized in that the housing (6) has at least one air inlet opening (8) and at least one air outlet opening (9), wherein the at least one air inlet opening (8) is designed such that air supplied to the housing (6) can flow into the housing (6) so as to flow around the battery (1), and wherein the at least one air outlet opening (9) is designed such that air can flow out of the housing (6), wherein the system includes an air supply device (14) having at least one air inlet opening (16, 161, 162) and having at least one air outlet opening (17) which is connected to the at least one air inlet opening (8) of the housing (6), wherein the air supply device (14) is designed to supply air, which flows in via the at least one air inlet opening (16, 161, 162) of the air supply device (14), to the housing (6), such that air supplied to the housing (6) flows into the housing (6) via the at least one air inlet opening (8) of the housing (6), wherein the at least one air inlet opening (16, 161, 162) of the air supply device (14) is configured to be arranged on a vehicle such that air from outside the vehicle (18) can be supplied to the housing (6) via the at least one air inlet opening (16, 161, 162) of the air supply device (14), wherein the system is designed for use with a passenger compartment (7) of the vehicle, wherein the housing (6) is configured to be arranged in the vehicle such that air flowing out of the housing (6) via the at least one air outlet opening (9) emerges outside the passenger compartment (7) of the vehicle, wherein the system includes a controller (20) that controls the air supply device (14), wherein the air supply device (14) includes a mixing flap (22) that is controlled by the controller (20) to control the flow of air into the at least one air inlet opening (8) of the housing (6), wherein the air supply device (14) includes a first channel that receives a first quantity of air from inside of the passenger compartment (7) in the vehicle and directs the first quantity of air to the at least one air inlet opening (8) of the housing (6), and a second channel that receives a second quantity of air from outside of the passenger compartment (7) and directs the second quantity of air to the at least one air inlet opening (8) of the housing (6), and wherein the controller (20) is configured to move the mixing flap (22) to control the flow of air through the first and second channels.

2. The system according to claim 1, characterized in that the air to be supplied to the housing (6) has moisture extracted from it before said air is supplied to the housing (6).

3. The system according to claim 1, characterized in that the supply of air to the housing (6) can be controlled by means of a control device (20).

4. The system according to claim 3, characterized in that the control device (20) is designed to control the supply of air as a function of the air humidity of the air that can be supplied, wherein the air humidity of the air that can be supplied is determined by means of an air humidity determination device (21).

5. The system according to claim 1, characterized by means for increasing the flow speed of the air to be supplied to the housing (6).

6. The system according to claim 1, characterized by means (27) for preventing the ingress of solid matter and/or liquids into the housing (6) via the at least one air outlet opening (9) and/or the at least one air inlet opening (8) of the housing (6).

7. The system according to claim 1, characterized by means (30) for preventing gases released by the battery (1) from escaping from the housing (6) through the at least one air inlet opening (8) of the housing (6) and/or through the at least one air inlet opening (16, 161, 162) of the air supply device (14), wherein the means (30) for preventing gases is selected from a group consisting of a ball valve and a mixing flap.

8. The system according to claim 1, characterized in that the at least one air inlet opening (16, 161, 162) of the air supply device (14) includes an air inlet opening (16, 161, 162) configured to be arranged in the vehicle such that air (19) from the passenger compartment (7) can be supplied to the housing (6) via the air inlet opening (16, 161, 162) by means of the air supply device (14).

9. The system according to claim 1 wherein the battery (1) is cooled by means of a cooling device.

10. The system according to claim 1, characterized in that the air to be supplied to the housing (6) has moisture extracted from it, by means of condensation drying, before said air is supplied to the housing (6).

11. The system according to claim 1, characterized in that the system is designed for use in a a hybrid, plug-in hybrid or electric motor vehicle.

12. A system for preventing condensate formation on a battery (1), wherein the battery (1) is surrounded by a housing (6), characterized in that the housing (6) has at least one air inlet opening (8) and at least one air outlet opening (9), wherein the at least one air inlet opening (8) is designed such that air supplied to the housing (6) can flow into the housing (6) so as to flow around the battery (1), and wherein the at least one air outlet opening (9) is designed such that air can flow out of the housing (6), wherein the system further includes a passenger compartment (7) of a vehicle that houses both the battery (1) and the housing (6), an air supply device (14) coupled to the at least one air inlet opening (8) that directs air into the at least one air inlet opening (8), and a controller (20) that controls the air supply device (14), wherein the air supply device (14) includes a mixing flap (22) that is controlled by the controller (20) to control the flow of air into the at least one air inlet opening (8), wherein the air supply device (14) includes a first channel that receives a first quantity of air from inside of the passenger compartment (7) and directs the first quantity of air to the at least one air inlet opening (8), a second channel that receives a second quantity of air from outside of the passenger compartment (7) and directs the second quantity of air to the at least one air inlet opening (8), and wherein the controller (20) is configured to move the mixing flap (22) to control the flow of air through the first and second channels.

* * * * *